Jan. 31, 1967     R. A. BODA     3,301,084
SINGLE LEVER CONTROL SYSTEM

Filed Nov. 23, 1964     6 Sheets-Sheet 1

INVENTOR.
ROBERT A. BODA
BY
Andrus & Starke
Attorneys

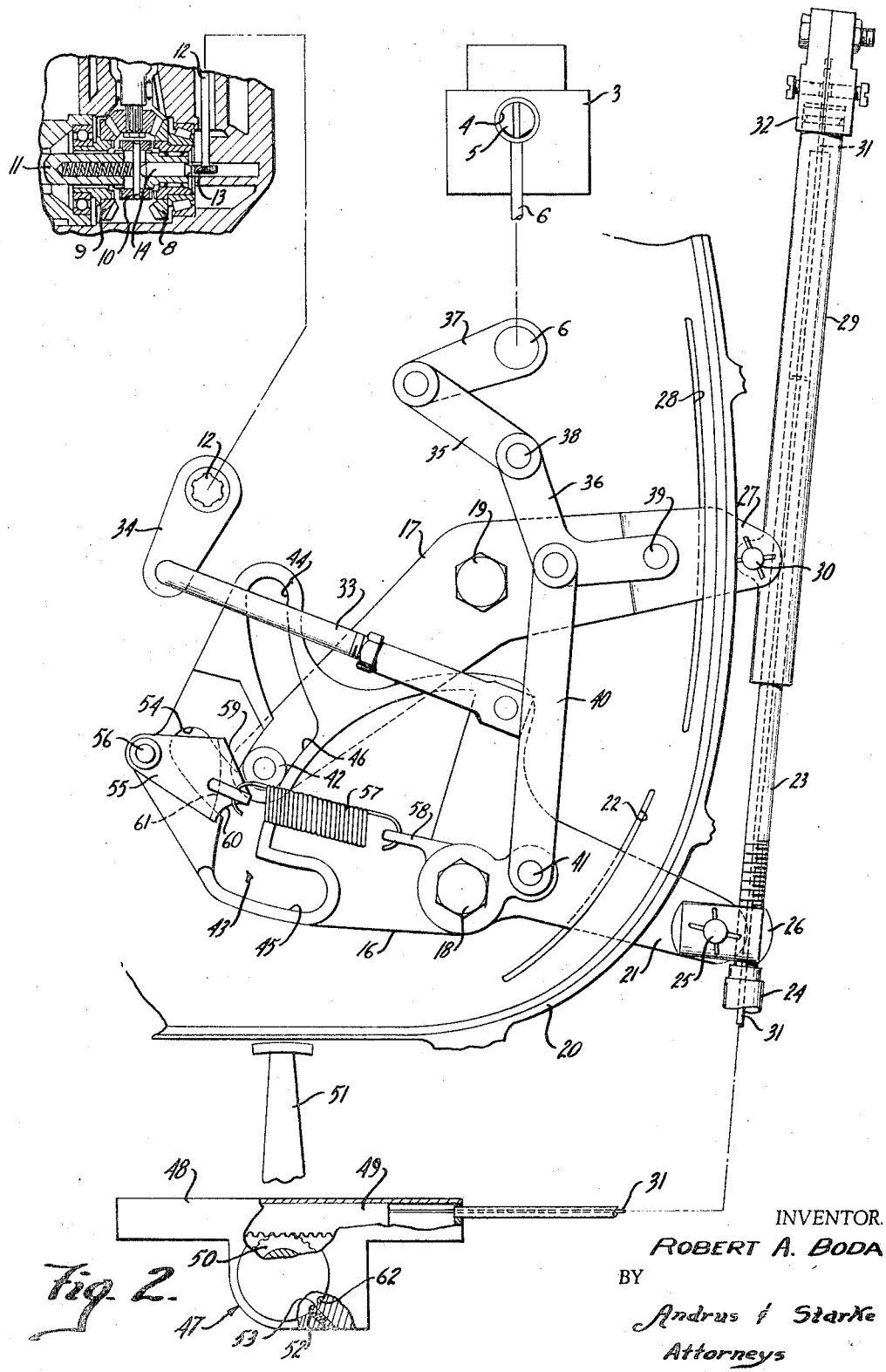

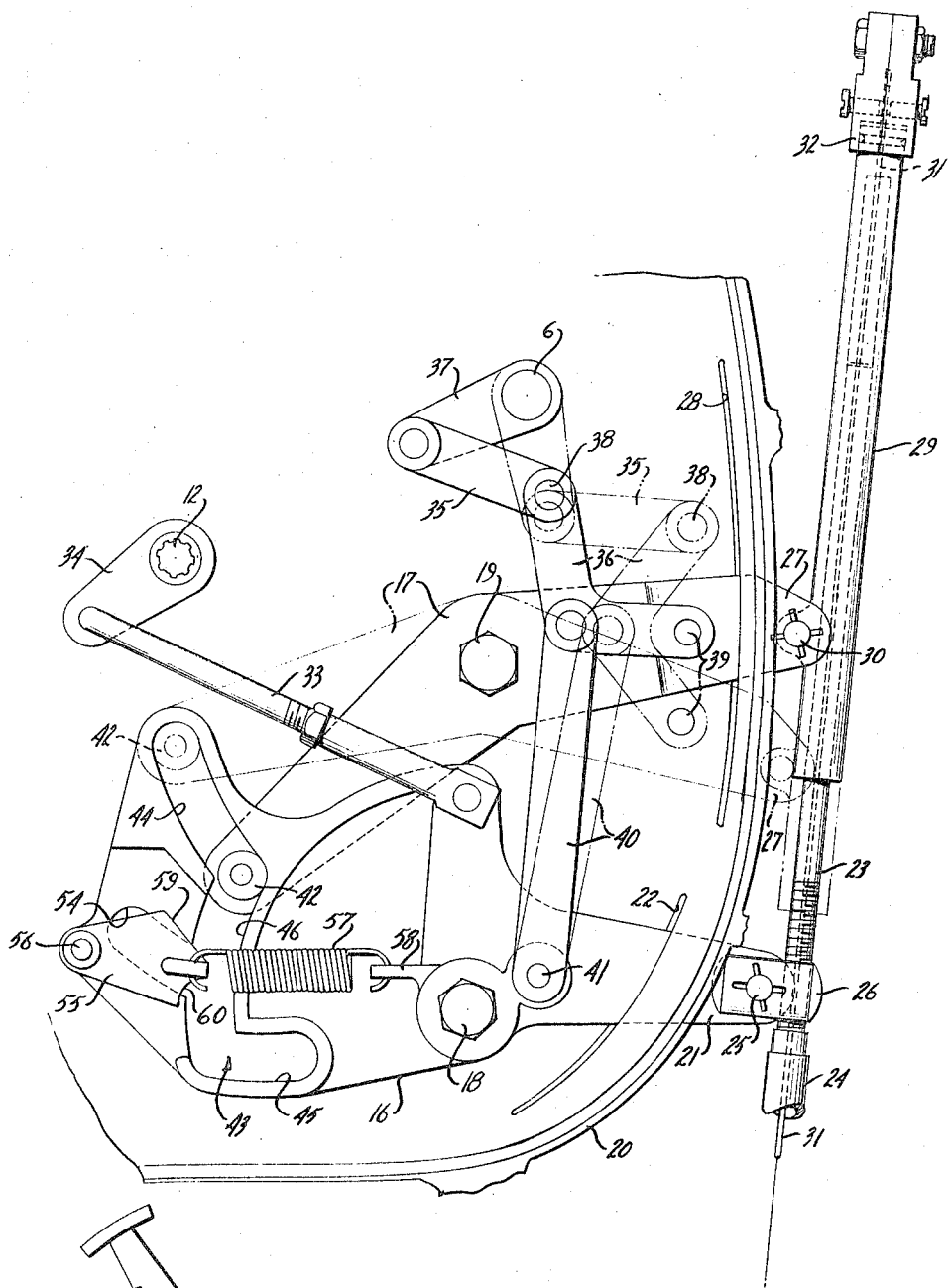

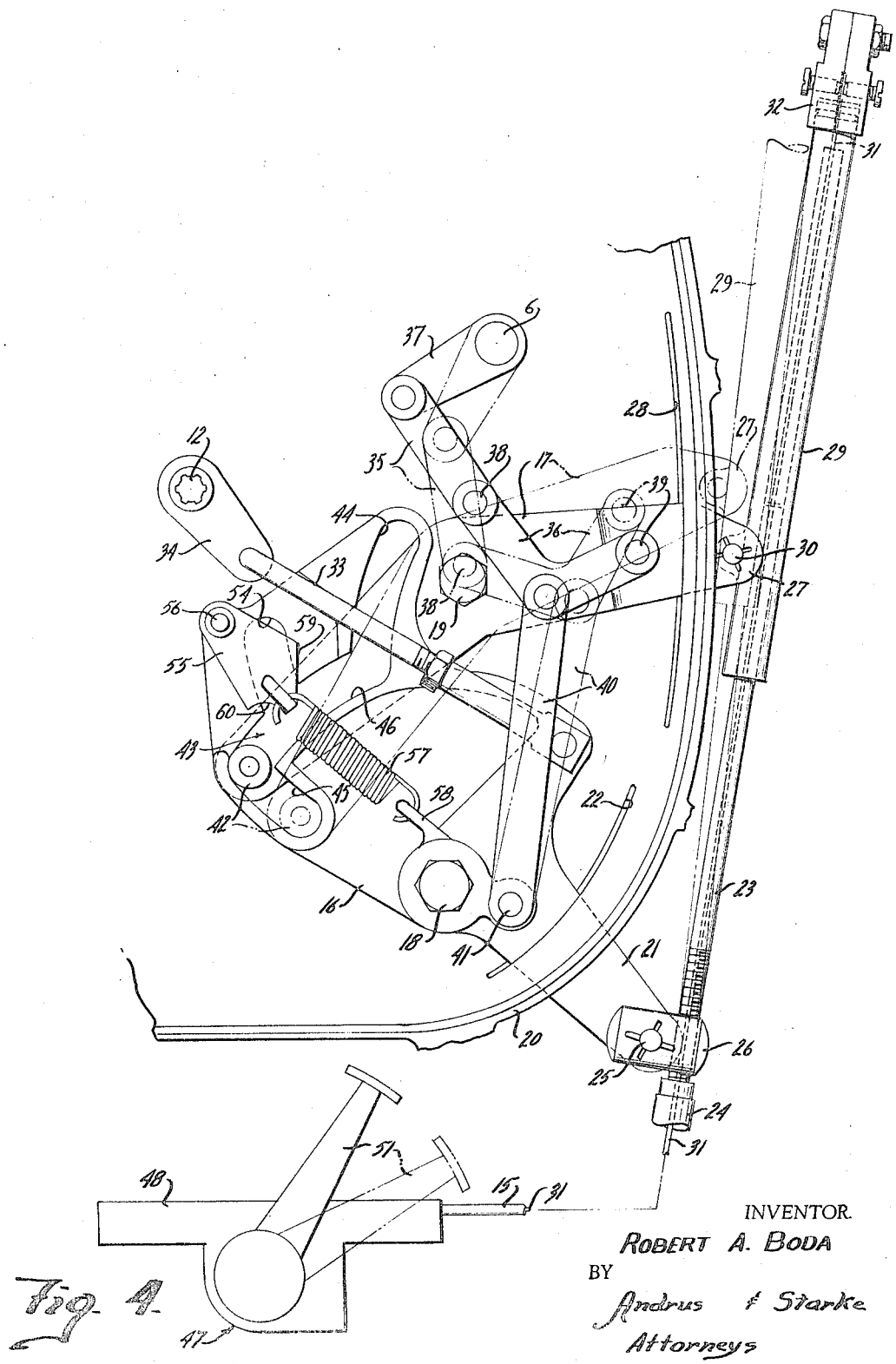

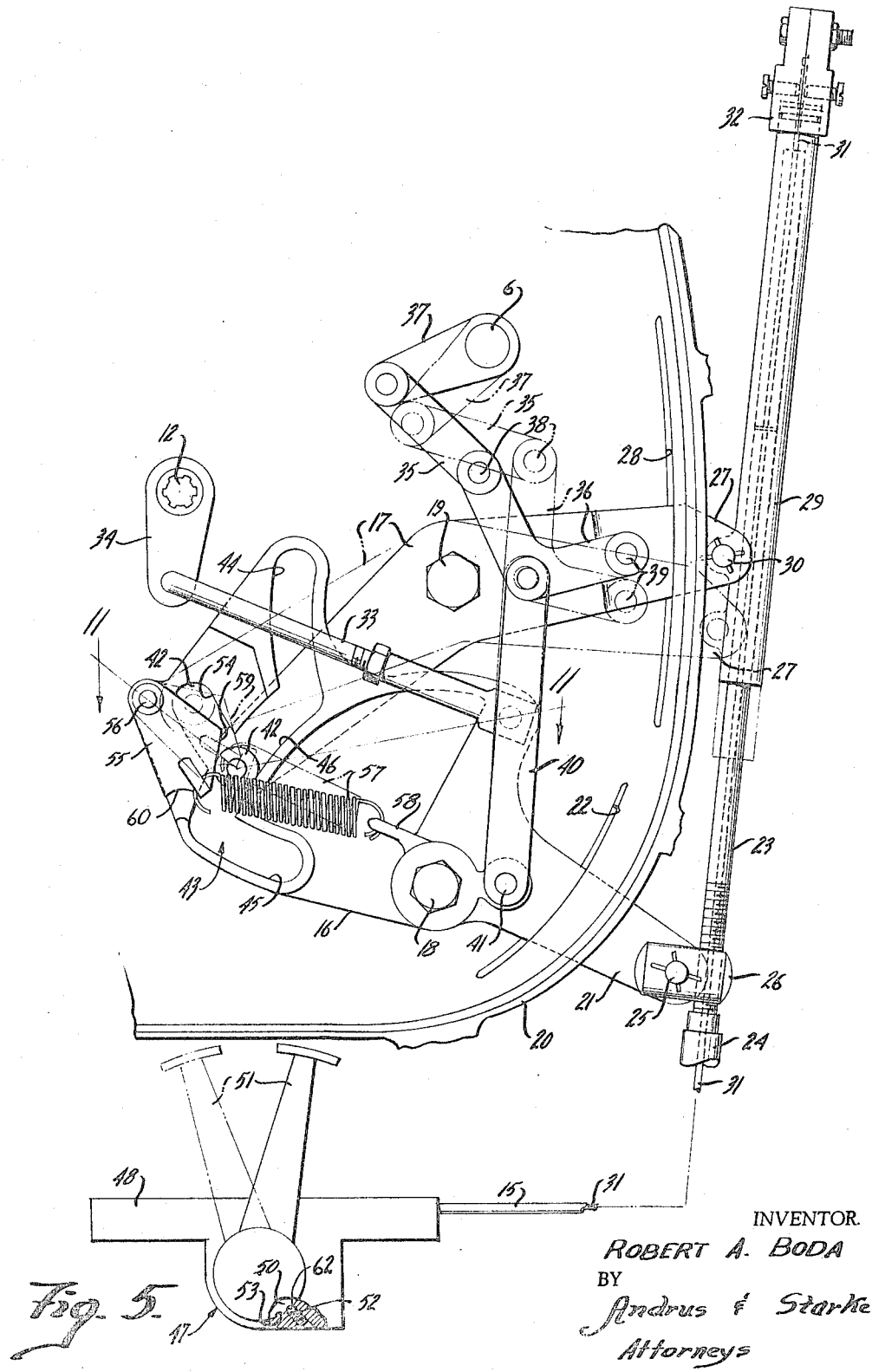

Jan. 31, 1967  R. A. BODA  3,301,084
SINGLE LEVER CONTROL SYSTEM
Filed Nov. 23, 1964  6 Sheets-Sheet 6
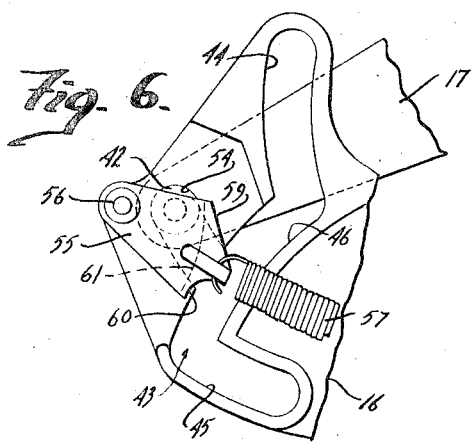
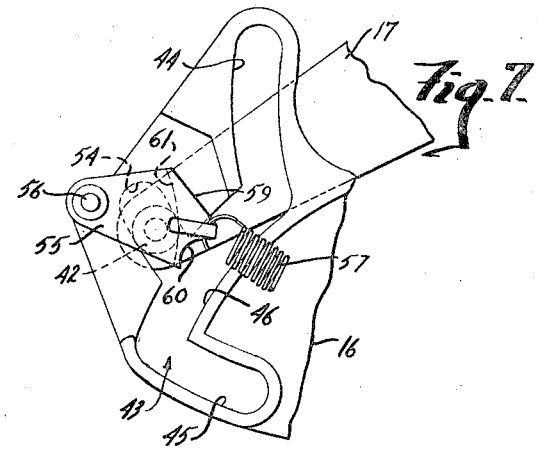
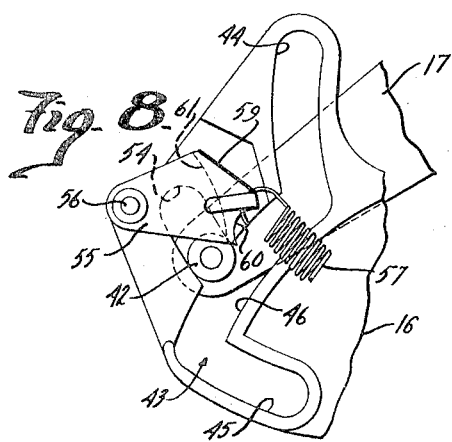
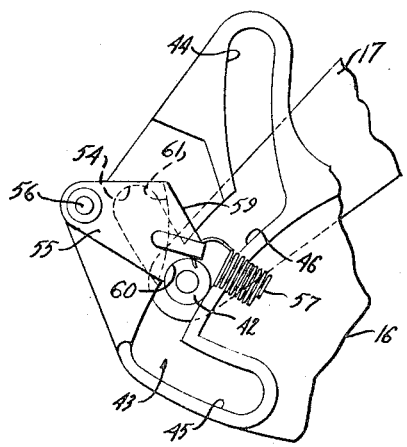
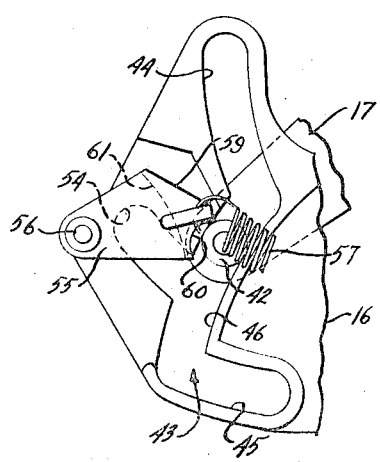
INVENTOR.
ROBERT A BODA
BY
Andrus & Starke
Attorneys United States Patent Office 3,301,084
Patented Jan. 31, 1967

3,301,084
SINGLE LEVER CONTROL SYSTEM
Robert A. Boda, Oshkosh, Wis., assignor to Kiekhaefer Corporation, Fond du Lac, Wis., a corporation of Wisconsin
Filed Nov. 23, 1964, Ser. No. 413,166
20 Claims. (Cl. 74—472)

This invention relates to a remote control system for multiple function operation by means of a single lever and a single cable as may be applied to the operation of the transmission and throttle of an outboard propulsion unit.

Single lever remote control units for performing several functions have heretofore generally required a separate cable for each function and separate means within the control unit for operating the corresponding cables. In view of the relatively high cost of the control cable, the cable requirements represent a substantial part of the cost of the control system. It is generally an object of this invention to provide a multiple function remote control system operable by a single lever control unit through a single cable which will reduce cable requirements about 50% and thus may effect a substantial reduction in the cost of the control system.

Generally, the control system of this invention comprises a pair of operatively connected levers each of which is adapted to perform a desired control function. The levers are interconnected for relative movement therebetween in a manner providing that the desired control functions are performed in a given relationship or sequence each to the other. The levers are actuated from a single lever remote control unit through a single flexible push-pull cable comprising a core wire and an outer casing therefor. One of the control levers is pivotally connected to the casing of the control cable and the other lever is pivotally connected to the core wire. Relative movement between the cable core wire and the casing as provided by operation of the control lever on the remote control unit effects a desired relative movement between the operatively connected levers to obtain the desired performance of control functions.

The drawings furnished herewith illustrate the best mode of carrying out the invention as presently contemplated and set forth hereinafter.

In the drawings:

FIG. 2 is generally a schematic view of the control system of this invention as applied to an outboard motor and shows the system in the neutral position;

FIG. 3 is a view similar to that of FIG. 2 and shows the control system in the forward drive position with the maximum forward throttle position being shown in phantom;

FIG. 4 is a view similar to that of FIG. 2 and shows the control system in the reverse drive position with the maximum reverse throttle position being shown in phantom;

FIG. 5 is a view similar to that of FIG. 2 and shows the control system in the neutral throttle position with the fast or maximum idle position being shown in phantom;

FIG. 6 is a detail view of a part of the control system of this invention and shows the relationship of the control levers in the fast or maximum idle position;

FIGS. 7–9 are views similar to that of FIG. 6 and show the relationship of the control levers at progressive stages as the control system is operated from fast idle to slow or minimum idle;

FIG. 10 is a view similar to that of FIG. 6 and shows the relationship of the control levers in the neutral position following operation at fast idle or reverse drive.

Figure 1:
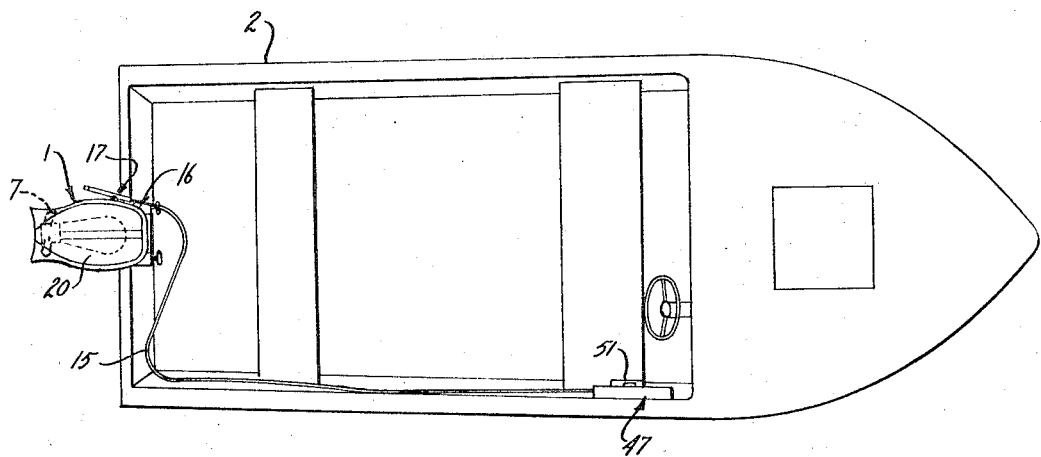
FIGURE 1 is a plan view of a watercraft with outboard motor and illustrates an application for the control system of this invention as applied to the transmission and throttle mechanism of the motor.
Figure 11:
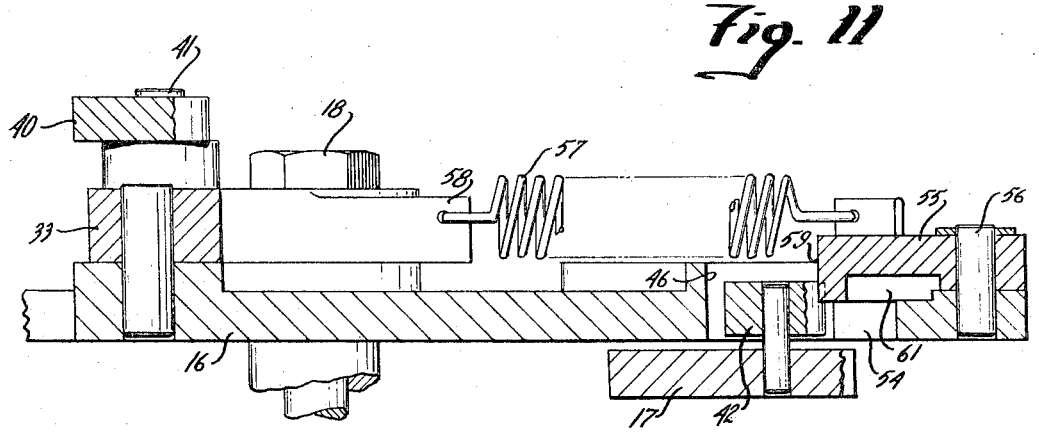
FIG. 11 is an enlarged sectional view taken generally on line 11—11 of FIG. 5.

Referring to the drawings, the control system of this invention is shown as applied to an engine driven propulsion unit 1 mounted on the watercraft 2 wherein the system is utilized to operate the throttle and clutch of the unit.

On the unit 1 a carburetor 3 supplies a suitable fuel mixture through an intake passage 4 to the engine (not shown). A throttle valve 5 is disposed in passage 4 and is rotatable with the shaft 6 to control the supply of fuel to the engine.

The propeller 7 is selectively rotatable in opposite directions for forward and reverse propulsion in accordance with selective engagement of the forward and reverse driven gears 8 and 9 by axially movable clutch element 10 rotatably carried by the propeller shaft 11 between the driven gears. Axial movement of clutch element 10 is effected by rotatable control rod 12 which carries the cam 13 at the lower end thereof for engagement with the axially movable spring-biased pin means 14 carrying the clutch element 10 and projecting from the forward end of shaft 11. The rod 12 and cam 13 are rotatable in opposed directions to selectively shift the clutch element 10 into engagement with driven gears 8 and 9 or into an intermediate neutral position.

According to the invention, the control system includes a single control cable 15 for operating a clutch control lever 16 and a throttle control lever 17. The levers 16 and 17 are pivotally mounted at 18 and 19 respectively within the cowl structure 20 of unit 1 and are operatively connected to provide for operation of clutch element 10 and throttle valve 5 in desired sequence.

From its mounting within the cowl structure 20, the clutch control lever 16 includes the portion 21 which extends outwardly through the slot opening 22 of the cowl and is pivotally connected to the rigid tubular extension 23 of the cable casing 24 by means of the pin 25 and barrel connector 26. The throttle control lever 17 includes the portion 27 which extends outwardly through the slot opening 28 of cowl 20 and is pivotally connected to the rigid tubular element 29 by means of the pin 30. Tubular element 29 is connected to the core wire 31 of cable 15 by means of the end connector 32 and is slidable on the casing extension 23 to provide for relative movement between the respective control levels 16 and 17 by operation of the cable in a manner to be described hereinafter.

The clutch actuating rod 12 is selectively movable in either direction to forward and reverse drive positions from the neutral position generally shown in FIG. 2. Operation of the actuating rod 12 by the clutch control lever 16 is effected through linkage member 33 which is pivotally secured at one end to the control lever 16 and at the other end to the actuating lever 34 carried by the actuating rod.

The throttle actuating shaft 6 is movable in a given direction from the idle position generally shown in FIG. 2 to open the throttle valve 5. Operation of the actuating shaft 6 by the throttle control level 17 is effected through a linkage arrangement including link 35 and bell crank 36. The link 35 has one end thereof pivotally secured to actuating lever 37 carried by the shaft 6 and the other end pivotally secured to the adjacent leg of the bell crank 36 at 38. The opposite leg of the bell crank 36 is pivotally secured to the outer portion 27 of the control lever 17 at 39. Intermediate the legs thereof, bell crank 36 is pivotally secured to the end of a link 40. The other end of link 40 is pivotally secured to the outer portion 21 of the clutch control lever 16 at 41, a relatively short distance from the pivot 18. Thus, with movement of the clutch control lever 16 into its several drive positions, the link 40 is moved to set the bell crank 36 into corresponding positions assuring proper functioning of shaft 6 with operation of the throttle control lever 17.

The inner portion of the throttle control lever 17 extends beneath the inner portion of the clutch control lever 16 and carries a roller 42 on a generally vertically axis engageable within a cam slot 43 in lever 16. The cam slot 43 includes angularly spaced forward throttle portion 44 and reverse throttle portion 45 which extend in opposite directions from and are connected by what may be termed a drive selection portion 46.

The drive selection portion 46 of cam slot 43 is struck on an arc from the pivot 18 of clutch control lever 16 and in the neutral position of lever 16, the roller 42 on the throttle control lever 17 is disposed generally centrally of cam slot portion 46 as generally shown in FIGS. 2 and 10. The length of cam slot portion 46 is adequate to provide for traversal of roller 42 through a forward and reverse shift range with selective pivotal movement of the clutch control lever 16. With counterclockwise rotation of clutch control lever 16 from neutral through the forward shift range, the clutch element 10 is shifted to engage the forward gear 8 and the roller 42 traverses slot portion 46 to the intersection with the forward throttle slot portion 44 as generally shown in FIG. 3. With clockwise rotation of lever 16 from neutral through the reverse shift range to engage the clutch element 10 with the reverse gear 9, roller 42 traverses slot portion 46 to the intersection with the reverse throttle slot portion 45 as generally shown in FIG. 4. Through either the forward or reverse shift ranges, the engagement between cam slot 43 and roller 42 prevents movement of the throttle control lever 17 from its idle position so that shifting is accomplished only at idle or minimum throttle.

Beyond the shift range in either direction from neutral, the control system of this invention includes a throttle range. At the end of the forward shift range, the roller 42 on the throttle control lever 17 is aligned for entry into the forward throttle slot portion 44 which is struck on an arc from the throttle control lever pivot 19 when the clutch control lever 16 is disposed in the forward drive position. In forward drive, the roller 42 is adapted to traverse slot portion 44 from idle position to full throttle position upon clockwise rotation of the throttle control lever 17 to actuate the corresponding linkage arrangement and advance throttle accordingly, as generally shown in FIG. 3. From any given throttle position, the roller 42 is returned to the idle position with counterclockwise rotation of lever 17.

At the end of the reverse shift range, the roller 42 is aligned for entry into the reverse throttle slot portion 45 which is struck on an arc from the throttle control lever pivot 19 when the clutch control lever 16 is disposed in the reverse drive position. As generally shown in FIG. 4, the roller 42 is adapted to traverse the reverse slot portion 45 from idle to full throttle upon counterclockwise rotation of throttle control lever 17 to advance throttle accordingly and is returnable to the idle position with clockwise rotation of lever 17.

Beyond the idle position in either the forward or reverse throttle range, the engagement between roller 42 and cam slot 43 maintains the clutch control arm 16 in the corresponding drive position. Thus, simultaneous movement of control levers 16 and 17 is substantially prevented.

Actuation of cable 15 to operate the control levers 16 and 17 is effected by control unit 47 which may be mounted in the watercraft 2 remote from the motor 1 and at a location convenient to the operator. The mounting of control unit 47 should provide for an initial relatively small amount of slack in cable 15. The casing 24 of cable 15 is fixedly secured to the housing 48 of control unit 47 while the core wire 31 of the cable enters the housing and is secured to the rack member 49 slidably disposed in the housing. The rack member 49 is movable in either direction from a given or neutral position by means of the gear member 50 in meshing engagement therewith. The gear member 50 is selectively rotatable by handle means 51 which has a generally upright neutral position as indicated by engagement of the spring-biased detent ball 52 mounted in the housing 48 within the detent notch 53 on gear member 50.

With the control system initially in neutral, movement of the handle means 51 forwardly for forward drive operation moves the rack member 49 forwardly within the control unit housing 48 and exerts a pull on the cable core wire 31. Since the throttle control lever 17 connected to core wire 31 cannot move in view of the engagement of roller 42 in cam slot portion 46, the pull of the rack member 49 removes slack from the core wire 31 or makes the wire more taut. With the end of cable casing 24 fixed at the control housing 48, increased tautness or removal of slack from core wire 31 will cause the other end of the casing 24 to advance further into the tubular element 29 and carry the clutch control lever 16 counterclockwise into the forward drive position. With the roller 42 moved into the forward drive position at the intersection of cam slot portions 44 and 46 counterclockwise movement of the clutch control lever 16 is interrupted and the throttle control lever 17 becomes free to move. Thus, with continued forward movement of the handle means 51 after the forward gear 8 is engaged, the core wire 31 responds by causing tubular element 29 connected thereto to move further onto the casing extension 23 to thereby carry the throttle control lever 17 clockwise a desired amount through the throttle range to advance throttle.

With return of the handle means 51 from the forward throttle range toward the neutral position, the core wire 31 is pushed and the tubular element 29 responds by moving relative to casing extension 23 to move the throttle control lever 17 counterclockwise to its idle position where further movement of the lever 17 is interrupted when roller 42 reaches the intersection of cam slot portions 44 and 46 and the clutch control lever 16 is then free to move. After movement of lever 17 is interrupted, further push on the core wire 31 as the handle means 51 is returned to its neutral position results in a return of more slack in wire 31 causing the cable casing extension 23 to withdraw from tubular element 29 to move the clutch control lever 16 in a clockwise direction to its neutral position and thereby shift the clutch element 10 to neutral.

Movement of handle means 51 rearwardly from neutral for reverse drive operation moves the rack member 49 rearwardly within control unit housing 48 and exerts a push on the cable core wire 31. With roller 42 disposed in cam slot portion 46, the throttle control lever 17 is initially immobile so that the push of the rack member 49 initially introduces more slack in the core wire 31 which causes the cable casing extension 23 to withdraw from tubular element 29 and carry the clutch control lever 16 clockwise into the reverse drive position. With the roller 42 moved into the reverse drive position at the intersection of cam slot portions 45 and 46, clockwise movement of the clutch control lever 16 is interrupted and throttle control lever 17 is free to move. Thus, with continued rearward movement of the handle means 51 after the reverse gear 9 is engaged, the core wire 31 moves rearwardly causing tubular element 29 to further withdraw from casing extension 23 to thereby carry the throttle control lever 17 counterclockwise a desired amount through the reverse throttle range to advance throttle.

With the return of the handle means 51 from the reverse throttle range toward neutral, the core wire 31 is pulled and the tubular element 29 initially responds by telescoping onto casing extension 23 to move the throttle control lever 17 clockwise to the idle position where further movement of lever 17 is interrupted by return of roller 42 to the intersection of cam slot portions 45 and 46. After interruption of movement of the throttle control lever 17, continued movement of handle means 51 to the neutral position results in removal of slack in core wire 31 causing the cable casing extension 23 to advance further into tubular element 29 to thereby carry the clutch control lever 16 counterclockwise to the neutral position and return the clutch element 10 to neutral.

In the case of an outboard propulsion unit, it is also desirable to provide means whereby the engine throttle may be advanced while in neutral for purposes of engine warmup, such means being provided in the control system of this invention.

The cam slot 43 in the clutch control lever 16 includes a neutral throttle slot portion 54 which intersects the slot portion 46 intermediate the positions assumed by roller 42 in the neutral and reverse drive positions of lever 16. Roller 42 reaches the location of intersection of slot portions 46 and 54 with a relatively small amount of clockwise rotation of clutch control lever 16 as will be evident from a comparison of FIGS. 2 and 5, the amount of clockwise movement of lever 16 being inadequate to engage clutch element 10 with the reverse gear 9. The neutral throttle slot portion 54 is struck on an arc from the pivot 19 of the throttle control lever 17 when the clutch control lever 16 is rotated to place roller 42 at the intersection of slot portions 46 and 54 which is herein termed the neutral throttle position of lever 16. With lever 16 disposed in the neutral throttle position, roller 42 may traverse the slot portion 54 by pivotal movement of the throttle control lever 17 as generally shown in FIG. 5, with clockwise movement of lever 17 advancing the throttle and counterclockwise movement of lever 17 retarding throttle.

Without more, the slot portion 54 would present difficulties when moving the clutch control lever 16 from reverse drive toward neutral in that the roller 42 is likely to enter slot portion 54 preventing a return of lever 16 to the neutral position. For this reason means in the form of a pivotal gate member 55 is provided to control access to slot portion 54 by the roller 42. The gate member 55 is pivotally mounted on the clutch control lever 16 at 56 adjacent the inner extremity of lever 16 and is biased into its normal access control position for slot portion 54 by the tension spring 57 disposed between the gate member and the projection 58 on lever 16 adjacent to pivot 18.

When the clutch control lever 16 is moved clockwise from its neutral position to the reverse drive position, the throttle control lever roller 42 engages the then adjacent angularly disposed downwardly projecting surface 59 of gate member 55 and merely swings the gate member out of its way in a clockwise direction against the bias of spring 57 as it traverses slot portion 46. Upon the passage of roller 42, the spring 57 returns the gate member 55 to its normal position. When the clutch control lever 16 is moved counterclockwise from the reverse drive position to the neutral postion, roller 42 engages the then adjacent downwardly projecting arcuate surface 60 of gate member 55 and swings the gate member out of its way in a counterclockwise direction as it traverses slot portion 46. The curvature of the arcuate surface 60 is generally struck on an arc from the axis of roller 42 when the roller axis is generally disposed on a line between the control lever pivot 18 and the gate member pivot 56. So contrived, the surface 60 on gate member 55 generally confines the roller 42 without binding as the roller is guided past the location of entry into neutral throttle cam slot portion 54 and remains in engagement with the roller into the neutral position of lever 16 as generally shown in FIG. 10. If now the operator desires to return lever 16 from neutral to the reverse drive position, roller 42 is guided past the location of entry into the neutral throttle cam slot portion 54 by the arcuate surface 60 of member 55. If instead the lever 16 is moved from neutral to the forward drive position, the roller 42 will clear the gate member 55 and the latter will be biased to its normal position.

Throttle advance in neutral is attainable only when clutch control lever 16 is moved clockwise to the neutral throttle position and presents the angular surface 59 of gate member 55 for engagement with roller 42 generally as shown in FIG. 5. As the lever 16 is moved to the neutral throttle position, the gate member 55 is moved clockwise upon engagement of surface 59 with roller 42. After roller 42 has assumed the position at the location for entry into slot portion 54 as shown in FIG. 5, the throttle is advanced with clockwise movement of the throttle control lever 17 causing the roller to entry the slot portion 54 while further pushing the gate member aside in a clockwise direction. At or near maximum neutral throttle as shown in phantom in FIG. 5 and in FIG. 6, the roller 42 has cleared the angular surface 59 of gate member 55 and the latter is free to swing back over the roller to its normal position.

Upon completion of engine warmup, the throttle control lever 17 is moved counterclockwise to retard throttle back to idle operation and the roller 42 is removed from the slot portion 54 as generally shown in FIGS. 7-9. As the roller 42 passes beneath gate member 55 and is withdrawn from slot portion 54 it engages with the inner downwardly projecting arcuate surface 61 of gate member 55 and moves the gate member out of the way in a counterclockwise direction to provide for reentry of the roller into slot portion 46. After roller 42 has cleared the gate member 55 and generally arrived at the idle position in slot portion 46, the spring 57 biases the gate member to effect engagement of the roller by the arcuate gate member surface 60 as shown in FIG. 9. With the throttle control lever 17 returned to its idle position and the roller 42 redisposed in slot portion 46, the clutch control lever 17 is again free to be selectively moved to either drive position or into its neutral position.

The control unit 47 acting through single cable 15 is readily adapted to provide throttle advance in neutral for engine warmup. From the neutral position of the control system as generally shown in FIG. 2, handle means 51 is moved rearwardly to a neutral throttle position as indicated by engagement of the second detent notch 62 in gear member 50 by the detent ball 52 in control housing 48 as generally shown in FIG. 5. The movement of handle means 51 rearwardly to the neutral throttle position adds enough slack to the cable core wire 31 to effect a withdrawal of cable casing extension 23 from tubular element 29 to move the clutch control lever 16 clockwise an amount adequate to place roller 42 at the location for entry into slot portion 54. To now advance the throttle in neutral, handle means 51 is moved forwardly from the neutral throttle poistion to pull the cable core wire 31 and move tubular element 29 further onto the casing extension 23 to thereby rotate the throttle control lever 17 clockwise as shown in phantom lines in FIG. 5.

At the conclusion of engine warmup, handle means 51 is returned to the neutral throttle position pushing cable core wire 31 and tubular element 29 to rotate the throttle control lever 17 in a counterclockwise direction to its idle position returning roller 42 to the cam slot portion 46. From the neutral throttle position at the conclusion of engine warmup, the handle means 51 is selectively movable to either drive position or to the neutral position as desired.

The control system of this invention is relatively simple to operate and requires but a relatively small control unit which utilizes a minimum of space within the watercraft for mounting and operation. Perhaps, however, the principal advantage for the control system of this invention is the need for only a single push-pull cable extending from the control unit to the motor for controlling multiple motor functions. Since the cost of cable is substantial, the elimination of at least one additional cable as usually required in control systems can amount to a substantial saving.

Various modes of carrying out the invention are contemplated as being within the scope of the following claims particularly pointing out and distinctly claiming the subject matter which is regarded as the invention.

I claim:

1. In a control system, a pair of operatively connected control members adapted to perform given control functions, a pair of telescoping members each of which is connected to a corresponding control member, a flexible push-pull cable having a core wire connected to one of the telescoping members and a casing connected to the other of the telescoping members, and means to actuate the push-pull cable to operate said telescoping members and thereby move the control members to perform the given functions.

2. In a control system, a pair of operatively connected control levers adapted to perform given control functions, a pair of telescoping members each of which is connected to a corresponding control lever, a flexible push-pull cable having a core wire connected to one of the telescoping members and a casing connected to the other of the telescoping members, and means to actuate the push-pull cable to telescopingly operate said members and thereby move the control levers to perform the given functions.

3. The invention as set forth in claim 2 wherein the operative connection between the control levers comprises a cam slot in one lever engageable by a follower in the other lever.

4. The invention as set forth in claim 3 wherein the cam slot contour provides for performance of the control functions by said control levers in a desired sequence.

5. The invention as set forth in claim 2 wherein the means to actuate the push-pull cable to telescopingly operate said members comprises a control unit having a housing and means in said housing adapted to actuate the cable core wire, said cable casing being anchored to said housing.

6. The invention as set forth in claim 5 wherein the means in said housing to actuate the cable core wire comprises a rack member slidable within the housing, a gear member meshingly engaging the rack member, and handle means to rotate the gear member to drive the rack member.

7. In a control for an engine driven marine propulsion unit having a throttle and gear shift means, throttle and gear shift control levers pivotally mounted on the propulsion unit and operatively connected to the throttle and gear shift means respectively of the propulsion unit, said levers being operatively connected and adapted to operate the throttle and gear shift means in a desired sequence, a pair of telescopingly related members each of which is connected to a corresponding control lever, a flexible push-pull cable having a core wire connected to one of the telescoping members and a casing connected to the other of the telescoping members, and means to actuate the push-pull cable to telescopingly operate said members and thereby move the control levers to operate the throttle and gear shift means.

8. In a control system for an engine driven marine propulsion unit having a throttle and gear shift means, a shift control lever pivotally mounted on the propulsion unit and operatively connected to the gear shift means, a throttle control lever pivotally mounted on the propulsion unit and operatively connected to the engine throttle means, one of said levers having a cam slot therein engageable by a follower on the other of said levers to provide for actuation of the throttle and gear shift means in a desired sequence, a pair of telescopingly related members each of which is connected to a corresponding control lever, a flexible push-pull cable having a core wire connected to one of the telescoping members and a casing connected to the other of the telescoping members, and means to actuate the push-pull cable to telescopingly operate said members and thereby move the control levers to operate the throttle and gear shift means.

9. The invention as set forth in claim 8 wherein the cam slot comprises angularly spaced forward and reverse throttle portions connected by a drive selection portion, said drive selection portion being struck on an arc from the shift control lever pivot and the forward and reverse throttle portions being struck on an arc from the throttle control lever pivot when the shift control lever is in the corresponding drive position.

10. The invention as set forth in claim 8 wherein the means to actuate the push-pull cable to telescopingly operate said members comprises a control unit having a housing and means in said housing adapted to actuate the cable core wire, said cable casing being anchored to said housing.

11. The invention as set forth in claim 10 wherein the means in said housing to actuate the cable core wire comprises a rack member slidable within the housing, a gear member meshingly engaging the rack member, and handle means to rotate the gear member to drive the rack member.

12. The invention as set forth in claim 8 wherein the cam slot is provided in the shift control lever and is engageable by a follower on the throttle control lever.

13. In a control system for an engine driven marine propulsion unit having a throttle and gear shift means, a shift control lever pivotally mounted on the propulsion unit and operatively connected to the gear shift means and having a neutral position and being selectively rotatable in either direction from said neutral position through a corresponding shift range to the forward and reverse drive positions respectively, a throttle control lever pivotally mounted on the propulsion unit and operatively connected to the engine throttle means and having an idle position and being selectively rotatable in either direction from said idle position through a throttle range to advance the throttle means, said shift control lever having a cam slot engageable by a follower on the throttle control lever, said cam slot having angularly spaced forward and reverse throttle portions connected by a drive selection portion, said cam slot drive selection portion being struck on an arc from the shift control lever pivot and being engageable by the throttle control lever follower in the idle position of the latter, said cam slot forward and reverse throttle portions being disposed on opposite sides of the intermediate drive selection portion and being struck on an arc from the throttle control lever pivot when the shift control lever is in the corresponding drive position to provide for throttle advance in the several drive positions of the shift control lever, and means to actuate the control levers to operate the marine propulsion unit throttle and gear shift means.

14. The invention as set forth in claim 13 wherein the means to actuate the control levers comprises a pair of telescopingly related members each of which is connected to a corresponding control lever, a flexible push-pull cable having a core wire connected to one of the telescoping members and a casing connected to the other of the telescoping members, and means to actuate the push-pull cable to telescopingly operate said members and thereby move the control levers to operate the throttle and gear shift means.

15. The invention as set forth in claim 13 wherein the shift control lever further has a neutral throttle position and the shift control lever cam slot includes a neutral throttle portion struck on an arc from the throttle control lever pivot when the shift control lever is in the neutral throttle position, said neutral throttle cam portion being negotiable by the throttle control lever follower upon movement of the throttle control lever with the shift control lever in the neutral throttle position to provide for throttle advance in neutral.

16. The invention as set forth in claim 15 wherein the neutral throttle position of the shift control lever is disposed intermediate the neutral position and the reverse drive position and the shift control lever neutral throttle cam slot portion is disposed on the same side of the drive selection cam portion as the forward drive cam portion.

17. In a control system for an engine driven marine propulsion unit having a throttle and gear shift means, a shift control lever pivotally mounted on the propulsion unit and operatively connected to the propulsion unit gear shift means and having a neutral position and being selectively rotatable in either direction from said neutral position through a corresponding shift range to the forward and reverse drive positions respectively and having a neutral throttle position intermediate the neutral position and the reverse drive position, a throttle control lever pivotally mounted on the propulsion unit and operatively connected to the propulsion unit throttle means and having an idle position and being selectively rotatable in either direction from said idle position to advance the throttle means, said shift control lever having a cam slot engageable by a follower on the throttle control lever, said cam slot having angularly spaced forward and reverse throttle portions connected by a drive selection portion and further including a neutral throttle portion, said cam slot drive selection portion being struck on an arc from the shift control lever pivot and being engageable by the throttle control lever follower in the idle position of the throttle control lever to provide for idling of the propulsion unit in neutral and through the respective shift ranges of the shift control lever, said cam slot forward and reverse throttle portions being disposed on opposite sides of the intermediate drive selection portion and being struck on an arc from the throttle control lever pivot when the shift control lever is in the corresponding drive position to accommodate the throttle control lever follower upon corresponding movement of the throttle control lever in the several drive positions of the shift control lever, said cam slot neutral throttle portion being disposed on the same side of the drive selection portion as the forward throttle portion and intersecting the drive selection portion intermediate the neutral and reverse drive positions of the throttle control lever follower and being struck on an arc from the throttle control lever pivot when the shift control lever is in the neutral throttle position to accommodate the throttle control lever follower upon corresponding movement of the throttle control lever with the shift control lever in the neutral throttle position, means controlling the entry of the throttle control lever follower into the neutral throttle cam portion, a pair of telescopingly related members each of which is connected to a corresponding control lever, a flexible push-pull cable having a core wire connected to one of the telescoping members and a casing connected to the other of the telescoping members, and means to actuate the push-pull cable to telescopingly operate said members and thereby move the control levers to operate the propulsion unit throttle and gear shift means.

18. The invention as set forth in claim 17 wherein the means controlling the entry of the throttle control lever follower into the neutral throttle cam portion comprises a pivotal member adapted to guide the follower past the neutral throttle cam portion upon movement of the shift control lever out of the reverse drive position.

19. The invention as set forth in claim 17 wherein the means for actuating the push-pull cable to telescopingly operate said members to control the propulsion unit comprises a control unit having cable drive means operable by handle means movable forwardly and rearwardly from a neutral position in accordance with forward and reverse operation of the propulsion unit, said handle means being movable rearwardly from neutral position a given amount to move the shift control lever to the neutral throttle position to align the throttle control lever follower with the neutral throttle cam slot portion and then forwardly to actuate the throttle control lever to advance the propulsion unit throttle means in neutral.

20. The invention as set forth in claim 19 wherein the control unit includes means for indicating the neutral throttle position for the control unit handle means.

References Cited by the Examiner
UNITED STATES PATENTS

| | | |
|---|---|---|
| 2,635,576 | 4/1953 | Kiekhaefer. |
| 2,847,872 | 8/1958 | Tood _____ 74—501 |
| 2,988,929 | 6/1961 | Williams. |

DAVID J. WILLIAMOWSKY, *Primary Examiner.*

H. S. LAYTON, *Assistant Examiner.*